United States Patent Office 3,070,630
Patented Dec. 25, 1962

3,070,630
PROCESS FOR PREPARING BORON ALKYLS
Robert A. Walde, Pittsburgh, Pa., assignor to Gulf Research & Development Company, Pittsburgh, Pa., a corporation of Delaware
No Drawing. Filed Oct. 31, 1958, Ser. No. 770,949
3 Claims. (Cl. 260—606.5)

This invention relates to a method for the production of organo-metallo compounds and more particularly to a method for the production of organo-metallo compounds wherein the metallic component thereof is selected from the group consisting of boron, aluminum, gallium and indium. The organo metallo compound produced in accordance with the present invention can be employed as a catalyst to polymerize compounds such as vinyl compounds, as a diesel fuel additive to increase the cetane number thereof, as a jet fuel additive to prevent flameout, as an intermediate for the preparation of gasoline additives, etc.

The process of this invention relates to the reaction of an organo-metallo compound selected from the group consisting of organo compounds of aluminum, gallium, indium and thallium with a halide of a metal selected from the group consisting of boron, aluminum, gallium and indium, said latter metal having a lower atomic number than the metallo portion of said organo-metallo compound, to obtain an organo-metallo compound selected from the group consisting of organo compounds of boron, aluminum, gallium and indium and a halide of a metal selected from the group consisting of aluminum, gallium, indium and thallium. In particular the process of this invention is extremely effective in the reaction of an aluminum alkyl, such as aluminum triisobutyl, with a metal halide, such as boron trifluoride, to obtain a metal alkyl, such as boron triisobutyl and an aluminum halide, such as aluminum trifluoride.

As stated the metal portion of the organo-metallo reactant must be selected from the group consisting of aluminum, gallium, indium and thallium. The organo portion thereof can be a hydrocarbon radical having from one to 30 carbon atoms, preferably one to 12 carbon atoms, such as alkyl, aryl, alkaryl, aralkyl, cycloalkyl, alkenyl, aralkenyl, or cycloalkenyl, straight or branch chained, or a substituted hydrocarbon radical. Examples of such organo-metallo compounds are triethyl aluminum, triisobutyl aluminum, triethyl gallium, triisobutyl gallium, triethyl indium, triisobutyl indium, triethyl thallium, triisobutyl thallium, etc. Preferred among the compounds of this invention are aluminum trialkyls such as trimethyl aluminum, triethyl aluminum, triisobutyl aluminum, trioctyl aluminum, tricyclohexyl aluminum, etc.

The metal portion of the metal halide reactant, as already defined, is selected from the group consisting of boron, aluminum, gallium and indium. The halide portion thereof can be fluorine, chlorine or bromine, with fluorine being preferred. In order for the reaction of the present invention to go, it is critical that the metal portion of the metallic halide have a lower atomic number than the metal in the organo-metallo reactant.

The amounts of reactants employed are not critical but should be employed in approximately stoichiometric amounts. In general, at least about one, and preferably about one to about 1.5 moles of organo-metallo reactant must be employed per mole of metal halide reactant.

I have found that when the reactants employed in the present process are joined together a white gelatinous mass is formed. This occurs before the reaction has reached completion, inhibiting further reaction due to mixing difficulties. This is especially true in the case where gaseous boron trifluoride is reacted with an aluminum alkyl. I have found that the reaction can be facilitated by joining one of the reactants, preferably the metal halide, with a complexing agent. Since the complexing agent can become a limiting factor in the completeness of the reaction, it is desirable that only one of the reactants be reacted with the complexing agent prior to the desired reaction. As complexing agents, a compound containing an electron donor atom selected from the group consisting of the elements nitrogen, phosphorus, oxygen and sulfur, preferably oxygen, can be employed. It is absolutely necessary, however, that no active hydrogen be present in the complexing agent, since the organo-metallo reactant would have a tendency to hydrolyze under the circumstances. Examples of complexing agents which can be used are ethyl ether, diethyl ether, butyl ether, diethyl thioether, thiophene, meta dioxane, 4,4-dimethyl-m-dioxane, tetrahydrafuran, trimethyl amine, tributyl amine, pyridine, trimethyl phosphine, triethyl phosphine, etc. The amount of complexing agent required is merely the stoichiometric amount necessary to combine with the desired reactant. About one mole of complexing agent per mole of reactant is therefore sufficient. In the case of a boron halide, such as boron trifluoride, such procedure has unexpected advantages. Boron trifluoride is gaseous at atmospheric pressure and temperature. When it is bubbled through a complexing agent such as anhydrous diethyl ether, the complex formed $(C_2H_5)_2O:BF_3$, is a liquid. The reaction with an organo-metallo compound is thereby facilitated.

In order to obtain a substantially complete reaction, it is absolutely necessary that the reactants be completely and thoroughly mixed prior to reaction. This is so because the reaction product is generally of a gel-like nature. If the reactants are not thoroughly mixed before reaction, it will be almost impossible to mix the remaining reactants after the appearance of the gel-like product. The length of time necessary to obtain good mixing is not critical and will of course depend upon the other variables involved. In general, a period of about one to about five minutes, preferably about two minutes, is satisfactory. Pressure and temperature are similarly not critical and need only be sufficient to maintain reactants, and solvents, when used, in the reaction zone during the mixing period without permitting the desired reaction to take place. Thus a temperature of about 0° to about 50° C. and a pressure of about one to about 5 atmospheres is suitable. A solvent is not necessary but desirable. Any solvent can be used which will not interfere with the reaction which will take place after mixing. For such reason, a complexing agent as solvent is undesirable. Among the hydrocarbon solvents which can be used are normal heptane, benzene, isooctane, normal hexane, toluene, etc.

After mixing, the reactants are raised to reaction temperature. While the temperature should be high enough to enable the reaction to proceed, it should not be so high that decomposition or degradation products are formed. Thus a temperature of about 50° to about 200° C., preferably about 80° to about 120° C., is satisfactory. The pressure can be about one to about 100 pounds per square inch, preferably about 5 to about 30 pounds per square inch absolute. In the case of oxygen and sulfur-containing electron donor compounds, the amount of time required for completion of the reaction is a direct function of the rate at which such complexing agent is evolved from the reaction zone. The extent of completion of the reaction is also a function of the completion of removal of such complexing agent. Temperatures and pressures are therefore so selected that the removal of such complexing agent is facilitated. A reaction time of at least about 5, and preferably about 5 to about 20 minutes, is satisfactory. Removal of such complexing agent and the produced metal alkyl from the produced metal halide can be facilitated by the addition of a displacement agent or chaser (whose boiling point is above that of the product alkyl) to the distillation subsequent to the reaction.

However, in the case where nitrogen and phosphorus-containing electron donor compounds are employed as complexing agents, stable complexes are formed between said complexing agents and a portion of the product metal alkyls. Thus, in such cases the rate of removal of the complexing agent from the reaction zone does not determine the time required for the reaction to reach completion. This is especially true in the case where boron trifluoride is reacted with an aluminum alkyl in the presence of a trialkyl amine. In general, a reaction time in this case is at least about 5, and preferably about 5 to about 20 minutes.

Since the metal halide which is formed is polymeric and gel-like in nature, it is not difficult to determine when the reaction has come to completion. Suspended in the gel, among other compounds, is the desired organo-metallo compound and the displacement agent, if used. Various methods for separating the organo-metallo compounds from the gel-like product can be employed, for example, filtration, centrifugation, aqueous solvation, distillation, etc. I have found that the organo-metallo compounds can best be recovered by distilling the reaction product under a reduced pressure of about 0.1 to about 760 mm. Hg, preferably about 20 to about 50 mm. Hg, and a temperature of about 5° to about 300° C., preferably about 80° to about 180° C. Naturally it should be borne in mind that the temperature and pressure used in the distillation will be determined by the vapor pressure of the metal alkyl being distilled. Recovery can be facilitated, as previously mentioned, regardless of the complexing agent used, by employing a chaser or displacement agent for the desired product organo-metallo compound having a higher boiling point than the latter, such as normal cetane, dodecane, mineral oil, etc. About 0.1 to about two moles of displacement agent per mole of total reaction product is satisfactory. To recover the displacement agent after the organo-metallo compound has been removed, the residue can be distilled at a temperature of about 50° to about 300° C. and a pressure of about 0.1 to about 760 mm. Hg. Remaining is the product metal halide.

The invention can further be understood by reference to the following examples.

*Example I*

Into a reaction flask were placed 0.470 mole of triisobutyl aluminum, 0.470 mole of boron trifluoride etherate and 100 grams of normal heptane solvent. The reactants were thoroughly mixed for 5 minutes at a temperature of 50° C. and atmospheric pressure. The resulting mixture was then raised to reaction temperature of 80° to 90° C. and atmospheric pressure. During the reaction the ethyl ether which was formed was continuously removed from the reaction zone. At the end of 20 minutes, the reaction was complete as evidenced by the formation of a gel. The reaction product was then subjected to displacement distillation at a temperature of 88° C. and a pressure of 28.2 mm. Hg in the presence of 152.0 grams of normal cetane as chaser for the boron alkyl. 81.66 grams of boron triisobutyl was recovered, amounting to 95 mole percent based on the triisobutyl aluminum employed. Also recovered was 2 mole percent of boron diisobutyl-fluoride and one mole percent boron isobutyl hydride.

*Example II*

The run of Example I was repeated with 0.680 mole of triisobutyl aluminum and 0.680 mole of boron trifluoride etherate. 155.4 grams of normal cetane solvent was also employed. Mixing was effected as in Example I, and the reaction was similar, except that a reaction temperature of 90° to 100° C. was employed. Recovery was also effected in the same manner in the presence of the 155.4 grams of normal cetane as chaser. 111.23 grams of boron triisobutyl was recovered, amounting to 87 mole percent based on the triisobutyl aluminum employed.

*Example III*

Trimethylamine triisobutyl aluminum was prepared by bubbling 19.5 grams of trimethylamine into 70.0 grams (0.329 mole) of triisobutyl aluminum at 50° C. 79.0 grams of normal cetane was added as a solvent, and then with cooling and good mixing 22.4 grams of gaseous boron trifluoride was passed into the reaction zone at 40° to 60° C. The reaction was very rapid and exothermic giving rise to formation of a white gelatinous reaction product. The reaction took 20 minutes to reach completion, at which time the pressure was reduced to 20 mm. Hg and distillation of the boron alkyl, first hoped to be formed, was attempted. At a pot temperature of 130° C. a white solid material sublimed along with a liquid product. The presence of this subliming white solid was the first indication that the amine complex of the boron alkyl had been formed. An aqueous solvation-organic extraction was used to separate the reaction products. Unexpectedly, the trimethylamine boron triisobutyl went in the aqueous layer along with the aluminum fluoride, but was not dissolved. As expected, the boron triisobutyl also formed went into the organic layer. The amine complex was isolated by filtration and was washed dry with petroleum ether. The boron triisobutyl was distilled. The yield of products, based on moles of aluminum alkyl added, was 26.0 grams of $(CH_3)_3 N:B(C_2H_9)_3$ and 21.0 grams of $B(C_2H_9)_3$, for a total yield of 74 percent.

Examples I, II and III demonstrate the beneficial effect of operating in accordance with my invention. Example IV below is a contrasting example which shows the detrimental effect of not following the basic precepts of my invention in carrying out the process as described hereinabove.

*Example IV*

Into a reaction flask there was charged 0.293 mole of triisobutyl aluminum and 183.0 grams of ethyl ether. To this with cooling there was added 0.293 mole of boron trifluoride etherate. The reaction mixture was refluxed at 40° C. for 2½ hours and only 102.0 grams of the ether was removed by means of a Dean-Stark trap. The resulting white gel was treated with aqueous HCl (a 1:1 mixture of $H_2O$ and 38 percent HCl) and the organic layer was removed and distilled to give a 63 mole percent yield of boron triisobutyl.

That it is necessary that at least one of the reactants be in complex form is apparent from Example V below.

*Example V*

To a 500 cc. Morton flask there was added 0.338 mole of triisobutyl aluminum, 33.5 grams of normal cetane as a solvent and chaser and 20.5 grams of normal heptane as a solvent. To this mixture there was added with stirring at 70° C. gaseous $BF_3$ until the formation of a white gelatinous mass prevented the absorption of further boron trifluoride. At this point, only 0.201 mole of boron trifluoride had been absorbed. A 6-inch distillation column was placed on the reaction vessel, and the product boron alkyls distilled at 19.5 mm. of Hg. The product was found to contain 0.1850 mole of boron triisobutyl, 0.0315 mole of boron diisobutyl monofluoride and 0.0645 mole of boron monoisobutyl difluoride. Thus the yield of boron alkyl based on the triisobutyl aluminum employed amounted to only 55 percent.

Obviously, many modifications and variations of the invention, as hereinabove set forth, may be made without departing from the spirit and scope thereof, and therefore only such limitations should be imposed as are indicated in the appended claims.

I claim:
1. In a process for reacting a trialkyl aluminum, wherein said alkyl substituent has from one to twelve carbon atoms, with boron trifluoride to obtain a boron alkyl, the improvement which comprises mixing a boron trifluoride-etherate, wherein the ether complexed with said boron trifluoride contains only ether functionality, with said trialkyl aluminum at a temperature of about 0° to about 50° C., heating the resulting mixture at a temperature of about 50° to about 200° C. while removing from the reaction zone substantially all of said complexed ether and thereafer recovering said boron alkyl.

2. In a process for reacting triisobutyl aluminum with boron trifluoride to obtain boron triisobutyl, the improvement which comprises mixing a boron trifluoride-etherate, wherein the ether complexed with said boron trifluoride contains only ether functionality, with said trialkyl aluminum at a temperature of about 0° to about 50° C., heating the resulting mixture at a temperature of about 50° to about 200° C. while removing from the reaction zone substantially all of said complexed ether and thereafter recovering said boron alkyl.

3. In a process for reacting triisobutyl aluminum with boron trifluoride to obtain boron triisobutyl, the improvement which comprises mixing a boron trifluoride-diethyl ether complex with said trialkyl aluminum at a temperature of about 0° to about 50° C., heating the resulting mixture at a temperature of about 50° to about 200° C. while removing from the reaction zone substantially all of said complexed ether and thereafter recovering said boron alkyl.

References Cited in the file of this patent

UNITED STATES PATENTS

| | | |
|---|---|---|
| 2,247,821 | Ruthruff | July 1, 1941 |
| 2,923,725 | Nowlin et al. | Feb. 2, 1960 |

FOREIGN PATENTS

| | | |
|---|---|---|
| 786,765 | Great Britain | Feb. 20, 1957 |

OTHER REFERENCES

Jenkner: German application Serial No. K 20071/IVb printed Apr. 5, 1956 (Klasse 12 2603).

The Van Nostrand Chemist's Dictionary, 1953, page 94.